Oct. 16, 1945.　　　　G. S. DUNHAM　　　　2,386,846
METHOD AND APPARATUS FOR CATALYTIC HYDROCARBON CONVERSION
Filed July 22, 1942
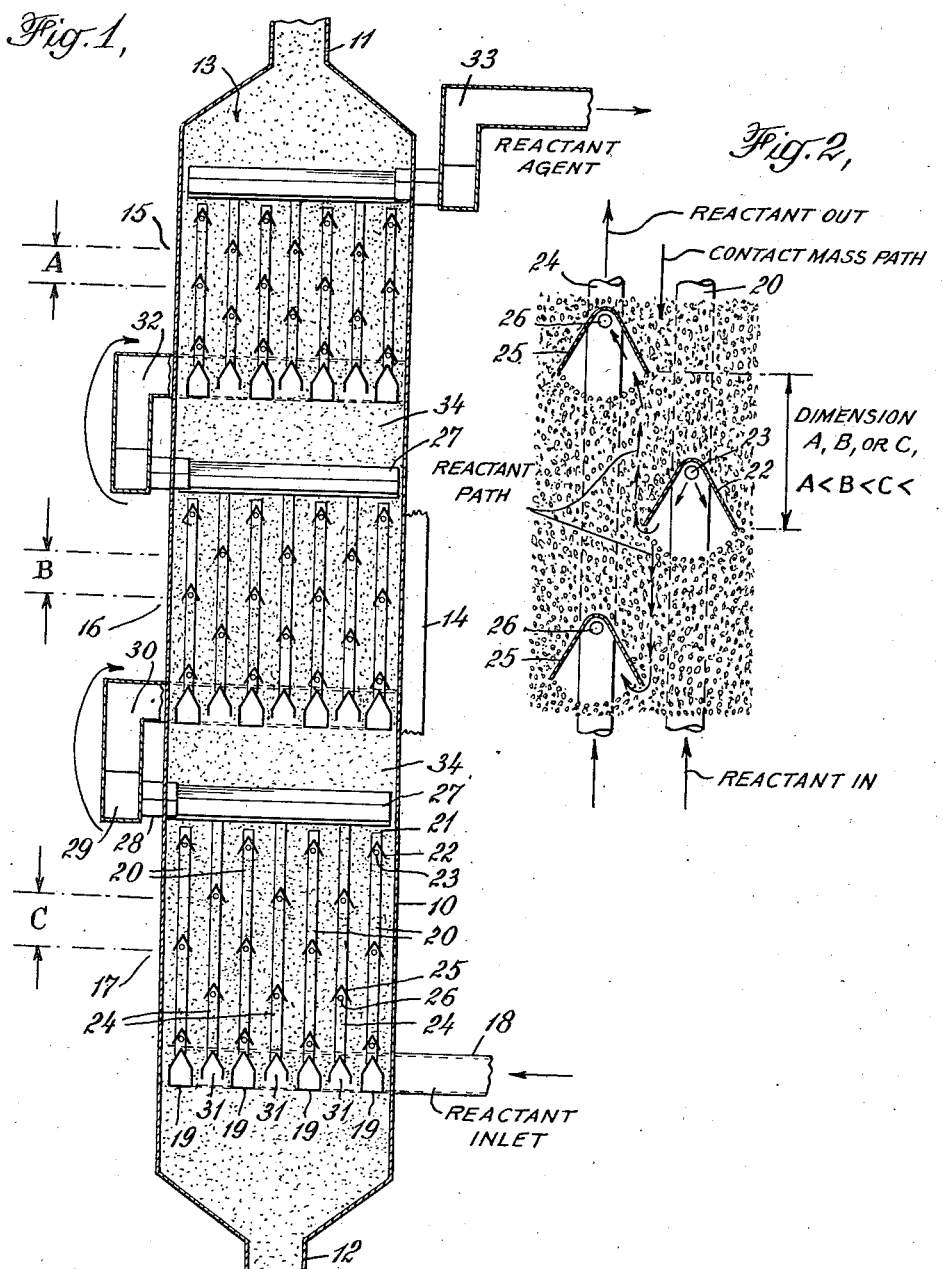

Patented Oct. 16, 1945

2,386,846

UNITED STATES PATENT OFFICE 2,386,846

METHOD AND APPARATUS FOR CATALYTIC HYDROCARBON CONVERSION

George S. Dunham, Merion, Pa., assignor to Socony-Vacuum Oil Company, Incorporated, a corporation of New York Application July 22, 1942, Serial No. 451,861

4 Claims. (Cl. 196—52)

This invention has to do with operations wherein fluid reactants are converted in the presence of a contact mass. It is specifically concerned with vapor phase conversion of hydrocarbons in the presence of moving beds of granular catalytic material having the general nature of clay or of similar associations of alumina and silica. Of particular interest in operations of this kind is the conversion of petroleum fractions of higher boiling point than gasoline, for example, those materials boiling between about 450° F. and about 750° F. to materials within the gasoline boiling range. Another conversion of interest is the treatment of material already within the gasoline boiling range to enhance its anti-knock properties or to alter its chemical nature in a manner effective to render it more suitable as fuel for internal combustion engines.

Another process of interest is the conversion of gaseous materials of hydrocarbon nature by polymerization to materials normally liquid within the boiling range of gasoline. Other processes are those of isomerization, hydrogenation, dehydrogenation, alkylation, dealkylation, cyclization and in fact any processes which may be conducted by exposing a fluid reactant to a contact mass which may be catalytic of itself to the desired reaction or which may carry a material catalytic to the desired reaction.

Taking the cracking of gas oil to gasoline as typical of these reactions within a contact mass, it is well known that when a gas oil boiling in the range of from about 450° F. to about 750° F. is heated and passed in vapor form at temperatures in the range of from about 800° F. to about 1000° F., a substantial conversion of the gas oil to materials in the gasoline boiling range occurs, together with the conversion of a small portion of the charge to permanently gaseous hydrocarbons and of a further small portion of the charge to a coke or carbonaceous residue which is deposited upon the catalytic material which in the usual case is a natural, refined, or synthetic material of the general nature of clay.

It is also well known that such processes may be conducted by operations wherein the catalyst moves through a conversion zone, through which conversion zone the hydrocarbon reactants are passed at reaction temperature to accomplish the desired conversion. In such processes, it is usual to remove the spent catalyst continuously from the reaction zone, to continuously regenerate the spent catalyst, and to continuously reintroduce the regenerated catalyst to the conversion zone.

In such operations it is also usual to introduce the catalyst to the conversion zone while it still contains heat arising from its exothermic regeneration, which exothermic regeneration comprised an oxidation of the carbonaceous impurities laid down upon the catalyst during conversion. In such processes, the activity of the catalyst varies progressively, decreasing as it proceeds through the reaction zone. This arises broadly from two causes, although other causes may play a considerable part in this variation of catalytic activity. The principal cause of variation is that, as the amount of carbonaceous deposit upon the catalyst increases, the net activity of a given bulk of catalyst will decrease. The second most important cause is that in the usual cases the residual heat in the catalyst arising from its regeneration is utilized to supply a portion of the endothermic heat usually required by the reaction being conducted and there is less and less of this stored up heat available as the catalyst progresses through the reaction zone. This varying activity of the catalyst has given rise to problems of considerable interest and of importance in providing for the most efficient utilization of the catalyst mass.

This invention is directed to a specific manner of and apparatus for contacting moving solid catalytic material and fluid reactants in a manner defined to secure an efficient utilization of all portions of the contact mass in view of the varying activity of the contact mass as it passes through the reaction zone.

This invention may be readily understood by reference to the drawing attached hereto, Figure 1 of which shows in section in diagram form, an apparatus suitable for carrying out the invention, of which Figure 2 is an enlarged detail of a very small portion.

Referring now to Figure 1, we find that 10 designates the enclosing shell of a vessel defining several conversion zones which vessel is provided with an inlet at 11 and an outlet at 12. Solid catalytic material 13 in granular or pelleted form, is introduced through 11 and withdrawn through 12, its flow being so controlled by devices which form no portion of this invention, that the interior of the reactor 10, except for space deliberately provided for in the construction thereof, is kept completely filled with the flowing column of solid catalyst which moves downwardly therethrough. It is usual to encase this reactor with insulation shown partially at 14. Within this reactor there are a plurality of reaction stages usually at least three in number, designated by 15, 16 and 17.

Turning now to the last of these reaction stages, namely 17, we find reactant fluid is introduced through a manifold 18 which communicates with a plurality of distributor boxes 19 disposed within the reactor. Upwardly from each of these distributor boxes, there extends a series of distributor pipes 20. These distributor pipes 20 are arranged in series along the top of each distributor box 19 in a plane perpendicular to the section plane of the drawing, which drawing is highly diagrammatic in form. Each of these distributor pipes is closed at its upper end 21. At intervals along the height of each distributor pipe, there is arranged an inverted trough 22, which trough extends across the diameter of the reaction zone in a plane perpendicular to that of the drawing. In each distributor pipe 20 and under each trough 22, there is an orifice 23. Alternating with the distributor pipes 20, there is a second series of vertical pipes 24 designated as collector pipes. Each collector pipe, at a level intermediate the locations of distributor troughs 22, is provided with a collector trough 25 and under each collector trough, there are provided orifices 26 in the collector pipes. These collector pipes 24 communicate at their upper ends with a series of manifolds or collector boxes 27 which collector boxes communicate through sleeves 28 with an external manifold 29, which manifold in turn becomes the inlet manifold 30 of the reaction stage next above the one just described. Returning now to the bottom portion of the reaction stage 17, we find that the distributor boxes 19 have a cross section not unlike that of a gabled roof house, and between them, dependent from the bottom end of each row of collector pipes 24, there is a series of open bottomed collector troughs 31, the general form of the distributor boxes 19 and collector troughs 31 cooperating to form a grid work through which the solid catalytic material may flow.

Turning now to Figure 2, we may gain a more accurate idea of the internal arrangement. In this figure we see a distributor pipe 20 carrying a distributor trough 22 and having an orifice 23 and by its side a collector pipe 24 having collector troughs 25 and orifices 26. We find also that the solid granular or pellet form contact mass flows downwardly around these tubes and troughs completely filling the reactor except for that space under each distributor or collector trough. We find that the fluid reactant flowing upwardly through distributor pipe 20 flows out through orifice 23 and out from under trough 22 into the contact mass and there moves both downwardly and upwardly through the contact mass to pass under the edge of the adjacent collector troughs 25 through the orifice 26 into the collector pipe 24 and so out of the reaction stage. In this form of construction, the extent of contact of reactant with catalyst is determined by the distance between the point of escape into the catalyst and the point of escape from the catalyst, namely, in this specific construction the vertical distance between the bottom edge of a distributor trough and the bottom edge of the next adjacent collector trough.

Returning now to Figure 1, we find that in the reactor there are arranged three stages of reaction, each defined by a construction exactly the same as that discussed in stage 17 at the bottom of the reactor, except that the dimensions A, B and C, the significance of which were discussed in connection with Figure 2, increase progressively toward the bottom of the reactor. In other words, the time of contact for a uniform velocity of reactant flow in all stages is increased progressively with decreasing activity of catalyst, that is, dimension A is less than dimension B which in turn is less than dimension C. In terms of the operating constants of a system of this kind, this arrangement means that with a constant throughput of reactants entering at 18, passing through stage 17, transferring through conduits 29 and 30 to stage 16 and passing therethrough, transferring at conduit 32 to stage 15 and passing therethrough and leaving the reactor through conduit 33, and with a constant rate of feed of the solid granular catalytic material 13, through the reactor, it is possible to contact reactants with the catalyst for the longest time in stage 17 where the least active catalyst is met and for the shortest time in stage 15 where the most active catalyst is met. This form of procedure has a feature which I believe to be a very definite advantage. Namely, while the reaction is conducted in stages, in each of which the criterion of exposure to reaction, namely, the space velocity is varied directly as the activity of the catalyst being contacted, still all of the reactants are brought into contact with all of the catalyst as contrasted with those operations wherein the same object is sought for by providing parallel flow of like portions of reactant through similar stages, as shown herein, with similar variations of space velocity.

Returning again to the drawing, it will be noted that between each of the reaction stages, there is a space 34, in which there is a relatively solidly packed bed of contact mass material. In all cases the depth of this relatively solid bed is greater than in dimension A, B or C by a sufficient amount so that the reactants will remain within their appropriate stage rather than bypass from stage to stage to any material degree.

The specific details of internal construction of the reactor shown merely illustrate a form of internal construction quite adaptable to the purpose of my invention and as such, these internal details are not a portion of the present invention. Many other forms of internal arrangement of reactors may be useful. As an example of one other form exceedingly simple in character, I may merely provide a series of beds within the reactor of progressively greater depth from top to bottom of the reactor and pass the reactant upwardly through these series of beds, each bed having appropriate reactant inlet and outlet means and an appropriate transfer means. All such modifications and variations I consider as being within the scope of my invention, as expressed by the claims appended hereto.

I claim:

1. Apparatus for effecting conversion of hydrocarbons in vapor form in contact with a moving bed of particle form solid catalytic material of varying activity comprising means to confine the flowing solid particle form catalyst to form a solid flowing column thereof, in said confining means a plurality of reaction stage defining means, in each reaction stage defining means, means for introducing hydrocarbon reactant into the moving catalyst mass and means for removing a hydrocarbon therefrom after it has passed for a predetermined contact distance through said catalyst mass, the several reaction stage means being so arranged that the said contact distance progressively increases in length from the stage nearest the entry of the catalyst to the reactor to the stage nearest the exit of catalyst from reactor and means to pass hydrocarbon vapor serially through all the reaction stages beginning with that reaction stage having the longest contact dimension.

2. Apparatus for effecting conversion of hydrocarbons in vapor form in contact with a moving bed of particle form solid catalytic material of varying activity comprising means to confine the flowing solid particle form catalyst to form a solid flowing column thereof, in said confining means a plurality of reaction stage defining means, each reaction stage defining means being separated from the next adjacent one by a substantial interval of column length, in each reaction stage defining means, means for introducing hydrocarbon reactant into the moving catalyst mass and means for removing a hydrocarbon therefrom after it has passed for a predetermined contact distance through said catalyst mass, the several reaction stage means being so arranged that the said contact distance progressively increases in length from the stage nearest the entry of the catalyst to the reactor to the stage nearest the exit of catalyst from reactor and means to pass hydrocarbon vapor serially through all the reaction stages beginning with that reaction stage having the longest contact dimension.

3. A method for conducting a conversion of hydrocarbons in vapor phase in contact with a moving bed of particle form solid catalytic material which varies in activity, which comprises passing all of the hydrocarbon vapors serially and in the absence of intervening heating through each of a series of contacting stages, passing all of the solid catalytic material serially through the same contacting stages in an order reverse to the order in which the hydrocarbon vapors pass, and progressively varying the space velocity employed in the contacting stages so that the greatest space velocity is employed in that contacting stage in which the solid catalytic material has the highest relative activity.

4. A method for the conversion of hydrocarbons of gas oil nature boiling in the range of from about 450° F. to about 750° F. in the presence of a solid particle form catalyst which comprises passing all of the hydrocarbons in vapor form at temperatures appropriate for conversion ranging from about 800° F. to about 1000° F. serially and in the absence of intervening heating through a series of contact stages, passing all of the solid particle form catalyst serially through the same contact stages and in countercurrent to the hydrocarbons and progressively varying the space velocity of the vapors in each stage throughout the series in such manner that the lowest space velocity is employed in the stage wherein vapors contact the catalyst of lowest relative activity.

GEORGE S. DUNHAM.